United States Patent
Liu et al.

(10) Patent No.: US 12,316,565 B2
(45) Date of Patent: May 27, 2025

(54) MEDIA ACCESS CONTROL (MAC) CONTROL ELEMENT (CE) FOR CONFIGURING PATHLOSS REFERENCE SIGNAL FOR SOUNDING REFERENCE SIGNAL (SRS)

(71) Applicant: Lenovo (Beijing) Ltd., Beijing (CN)

(72) Inventors: Bingchao Liu, Changping District (CN); Chenxi Zhu, Haidian District (CN); Lianhai Wu, Chaoyang (CN); Wei Ling, Changping (CN); Yi Zhang, Chao Yang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 364 days.

(21) Appl. No.: 17/787,428

(22) PCT Filed: Jan. 3, 2020

(86) PCT No.: PCT/CN2020/070208
§ 371 (c)(1),
(2) Date: Jun. 20, 2022

(87) PCT Pub. No.: WO2021/134772
PCT Pub. Date: Jul. 8, 2021

(65) Prior Publication Data
US 2023/0017292 A1    Jan. 19, 2023

(51) Int. Cl.
*H04L 5/00* (2006.01)
*H04B 17/309* (2015.01)

(52) U.S. Cl.
CPC ......... *H04L 5/0051* (2013.01); *H04B 17/309* (2015.01); *H04L 5/0094* (2013.01)

(58) Field of Classification Search
CPC ... H04B 17/309; H04L 5/0044; H04L 5/0048; H04L 5/0051; H04L 5/0053; H04L 5/0091; H04L 5/0094
See application file for complete search history.

(56) References Cited

U.S. PATENT DOCUMENTS

| | | |
|---|---|---|
| 2018/0160379 A1 | 6/2018 | Yokomakura et al. |
| 2019/0281588 A1 | 9/2019 | Zhang et al. |
| 2019/0372806 A1 | 12/2019 | Park et al. |

FOREIGN PATENT DOCUMENTS

| | | |
|---|---|---|
| CA | 3061633 A1 | 10/2019 |
| CN | 102215589 A | 10/2011 |
| CN | 109803427 A | 5/2019 |
| CN | 110089162 A | 8/2019 |
| WO | 2018203662 A1 | 11/2018 |

OTHER PUBLICATIONS

Vivo ("Remaining issues on multi-beam transmission"; R1-1912040; 3GPP TSG RAN WG1 #99; Reno, USA, Nov. 18-22, 2019) (Year: 2019).*

(Continued)

*Primary Examiner* — Melvin C Marcelo
*Assistant Examiner* — Natali Pascual Peguero
(74) *Attorney, Agent, or Firm* — FIG. 1 Patents (57) ABSTRACT

Methods and apparatuses for configuring pathloss reference signal to SRS resource set(s) are disclosed. A method comprises configuring pathloss reference signal for one or more SRS resource sets by using a MAC CE and transmitting a PDSCH carrying the MAC CE.

20 Claims, 8 Drawing Sheets

(56) References Cited

OTHER PUBLICATIONS

OPPO, "Discussion on Multi-beam Operation Enhancements", 3GPP TSG RAN WG1 #98bis, R1-1910117, Chongqing, China [retrieved Aug. 22, 2022]. Retrieved from the Internet <https://www.3gpp.org/ftp/TSG_RAN/WG1_RL1/TSGR1_98b/Docs/>., Oct. 2019, 11 Pages.
PCT/CN2020/070208, "International Preliminary Report on Patentability", PCT Application No. PCT/CN2020/070208, Jul. 14, 2022, 5 pages.
PCT/CN2020/070208, "International Search Report and Written Opinion", PCT Application No. PCT/CN2020/070208, Oct. 15, 2020, 6 pages.
Vivo, "Remaining issues on multi-beam transmission", 3GPP TSG RAN WG1 #99, R1-1912040, Reno, USA [retrieved Aug. 22, 2022]. Retrieved from the internet <https://www.3gpp.org/ftp/tsg_ran/WG1_RL1/TSGR1_99/Docs>., Nov. 2019, 10 Pages.
20911132.7, "Extended European Search Report", EP Application No. 20911132.7, Sep. 1, 2023, 12 pages.
3GPP, "Medium Access Control (MAC) protocol specification (2 of 3)", 3GPP TS 38.321, V15.7.0 Release 15 [retrieved Oct. 16, 2023]. Retrieved from the Internet <https://www.etsi.org/deliver/etsi_ts/138300_138399/138321/15.07.00_60/ts_138321v150700p.pdf> 2 of 3, Oct. 2019, 23 pages.
Huawei, et al., "MAC CE signalling for multi-beam enhancement", 3GPP TSG-RAN WG2 Meeting#108, R2-1914676, Reno, USA [retrieved Oct. 16, 2023]. Retrieved from the Internet <https://www.3gpp.org/ftp/tsg_ran/WG2_RL2/TSGR2_108/Docs>, Nov. 2019, 13 pages.
Oppo, "Discussion on Multi-beam Operation Enhancements", 3GPP TSG RAN WG1 #99, R1-1911844, Reno, USA [retrieved Aug. 5, 2022] retrieved from the internet <https://www.3gpp.org/ftp/tsg_ran/WG1_RL1/TSGR1_99/Docs>., Nov. 2019, 13 Pages.
Vivo, "Discussion on eMIMO MAC CE", 3GPP TSG-RAN WG2 Meeting #108, R2-1916259, Reno, USA [retrieved Nov. 17, 2023]. Retrieved from the Internet <https://www.3gpp.org/ftp/tsg_ran/WG2_RL2/TSGR2_108/Docs>, Nov. 2019, 7 pages.
ZTE, "Enhancements on multi-beam operation", 3GPP TSG RAN WG1 Meeting #98bis, R1-1910285, Chongqing, China [retrieved Aug. 5, 2022]. Retrieved from the internet <https://www.3gpp.org/ftp/tsg_ran/WG1_RL1/TSGR1_98b/Docs>., Oct. 2019, 24 Pages.
202080091061.7, "Foreign Office Action", CN Application No. 202080091061.7, Jul. 16, 2024, 10 pages.
"Foreign Notification to Grant", CN Application No. 202080091061.7, Jan. 28, 2025, 3 pages.

\* cited by examiner

MEDIA ACCESS CONTROL (MAC) CONTROL ELEMENT (CE) FOR CONFIGURING PATHLOSS REFERENCE SIGNAL FOR SOUNDING REFERENCE SIGNAL (SRS)

FIELD

The subject matter disclosed herein generally relates to wireless communications, and more particularly relates to configuring pathloss reference signal for SRS.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Next Generation Node B (gNB), Orthogonal Frequency Division Multiplexing (OFDM), Radio Resource Control (RRC), Reference Signal (RS), Time-Division Duplex (TDD), Time Division Multiplex (TDM), User Entity/Equipment (Mobile Terminal) (UE), Uplink (UL), Universal Mobile Telecommunications System (UMTS), Long Term Evolution (LTE), Narrowband (NB), Physical Downlink Shared Channel (PDSCH), Physical Uplink Shared Channel (PUSCH), Physical Uplink Control Channel (PUCCH), Downlink control information (DCI), Universal Mobile Telecommunications System (UMTS), Evolved-UMTS Terrestrial Radio Access (E-UTRA or EUTRA), Media Access Control (MAC), Control Element (CE), Bandwidth Part (BWP), Technical specification (TS), pathloss reference signal (PL-RS), Sounding Reference Signal (SRS), Synchronization Signal Block (SSB), Non Zero Power (NZP), Channel State Information (CSI), Reference Signal (RS), semi-persistent SRS (SP SRS), aperiodic SRS (AP SRS), component carrier (CC).

In NR Release 15, the pathloss reference signal (PL-RS) for SRS is configured by RRC signaling per SRS resource set. All of SRS resources contained in one SRS resource set share the same PL-RS to determine the transmit power for the SRS transmission.

For UL beam management latency and overhead reduction, the configuration of PL-RS by RRC signaling is not desirable, because a RRC signaling consumes about 100 ms. During this time period, the required pathloss reference signal may be changed and the configured pathloss reference signal may not be suitable. Therefore, a new more efficient mechanism is necessary to indicate (or update) the PL-RS quickly.

It is therefore an object of the present invention to provide methods and apparatuses to implement indication (or update) of pathloss reference signal for SRS.

BRIEF SUMMARY

Methods and apparatuses for configuring pathloss reference signal to SRS resource set(s) are disclosed.

In one embodiment, a method comprises configuring pathloss reference signal for one or more SRS resource sets by using a MAC CE and transmitting a PDSCH carrying the MAC CE.

In one embodiment, the MAC CE includes one or more SRS resource set IDs each of which indicates a SRS resource set for which the MAC CE applies. The MAC CE may further include one or more SRS pathloss reference signal IDs each of which indicates a pathloss reference signal configured for the SRS resource set indicated by the SRS resource set ID in the MAC CE.

In another embodiment, the MAC CE includes a single SRS resource set ID and a bitmap of $S_i$, each $S_i$, which is 1 bit, indicates an activation status of a configured SRS pathloss reference signal, and only a single $S_i$ is activated for the SRS resource set indicated by the single SRS resource set ID. In some embodiment, the MAC CE includes a bitmap of $t_i$, each $t_i$, which is 1 bit, indicates a SRS resource set ID, each $t_i$ indicates whether the MAC CE applies to the SRS resource set with the SRS resource set ID being equal to i.

In some embodiment, the MAC CE includes a PL-RS ID which is either a ssb-Index indicating a SS/PBCH block or a csi-RS-Index indicating a NZP CSI-RS resource, wherein the SS/PBCH block or the NZP CSI-RS resource is used as the pathloss reference signal configured for the SRS resource set indicated by the SRS resource set ID. The MAC CE may further include a one bit field to indicate whether the PL-RS ID is the ssb-Index or the csi-RS-Index.

In some embodiment, the MAC CE includes a serving cell ID, when the serving cell ID is within a simultaneousSpatialRelationCellList, the pathloss reference signal is configured for all SRS resource sets with the same SRS resource set ID for all BWPs in the cells within the simultaneousSpatialRelationCellList containing the serving cell ID.

In one embodiment, a base unit comprises a processor for configuring pathloss reference signal for one or more SRS resource sets by using a MAC CE; and a transmitter for transmitting a PDSCH carrying the MAC CE.

In another embodiment, a method comprises receiving a PDSCH carrying a MAC CE, wherein the MAC CE is used to configure pathloss reference signal for one or more SRS resource sets.

In yet another embodiment, a remote unit comprises a receiver for receiving a PDSCH carrying a MAC CE, wherein the MAC CE is used to configure pathloss reference signal for one or more SRS resource sets.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

MAC CE can perform configuration faster than RRC signaling. Therefore, the present invention proposes to configure PL-RS for SRS by using a MAC CE, and transmit a PDSCH carrying the MAC CE from the base unit (e.g. gNB) to the remote unit (e.g. UE).

The PL-RS for SRS is configured per SRS resource set. That is, all of SRS resources contained in one SRS resource set use the same PL-RS for SRS power control to determine the transmit power for the SRS transmission. When a PL-RS is first configured for a SRS resource set (i.e. the SRS resource set was not configured with a PL-RS for SRS previously), it is said the PL-RS for SRS is indicated to the SRS resource set. When a new PL-RS for SRS is configured for a SRS resource set (i.e. the SRS resource set was configured with a PL-RS for SRS previously), it is said the PL-RS for SRS is updated to the SRS resource set. Up to 64 pathloss reference signals for SRS, i.e. SRS-PathlossReferenceRSs, can be configured for a UE in a BWP according to UE capability by RRC signaling, and one of them can be selected and configured for a SRS resource set at a time.

Figure 1:
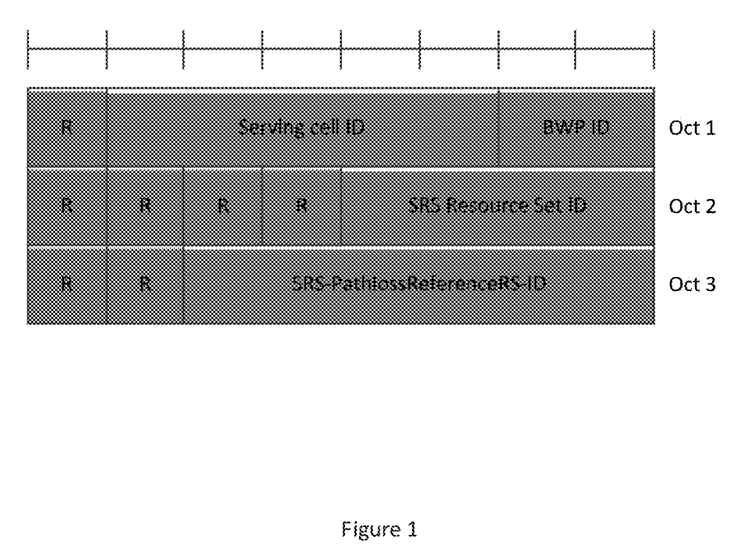
FIG. 1 illustrates an example of SRS pathloss reference signal indication MAC CE according to a first embodiment.

An example of the SRS pathloss reference signal indication MAC CE according to the first embodiment is illustrated in FIG. 1. The MAC CE according to the first embodiment is used to indicate or update a SRS pathloss reference signal (SRS-PathlossReferenceRS) to one SRS resource set. The following fields are included:

(1) Serving Cell ID: This field indicates the identity of the serving cell for which the MAC CE applies. The length of the Serving Cell ID field is 5 bits.

(2) BWP ID: This field indicates a UL BWP for which the MAC CE applies as the codepoint of the DCI bandwidth part indicator field. The length of the BWP ID field is 2 bits.

(3) SRS Resource Set ID: This field indicates a SRS resource set for which the MAC CE applies. The length of the SRS Resource Set ID field is 4 bits, as a maximum of 16 SRS resource sets can be configured for a UE in a BWP according to UE capability.

(4) SRS-PathlossReferenceRS-ID: This field indicates a SRS pathloss reference signal (SRS-PathlossReferenceRS) configured for the SRS resource set indicated by the SRS Resource Set ID field. The length of SRS-PathlossReferenceRS-ID is 6 bits, as up to 64 SRS-PathlossReferenceRSs can be configured for a UE in a BWP according to UE capability.

(5) R: Reserved bit. Each of the reserved bits may be set to "0".

According to the first embodiment, the SRS pathloss reference signal indication MAC CE has a fixed size of 24 bits. The SRS pathloss reference signal indication MAC CE according to the first embodiment can indicate (or update) a SRS pathloss reference signal to one SRS resource set.

Figure 2:
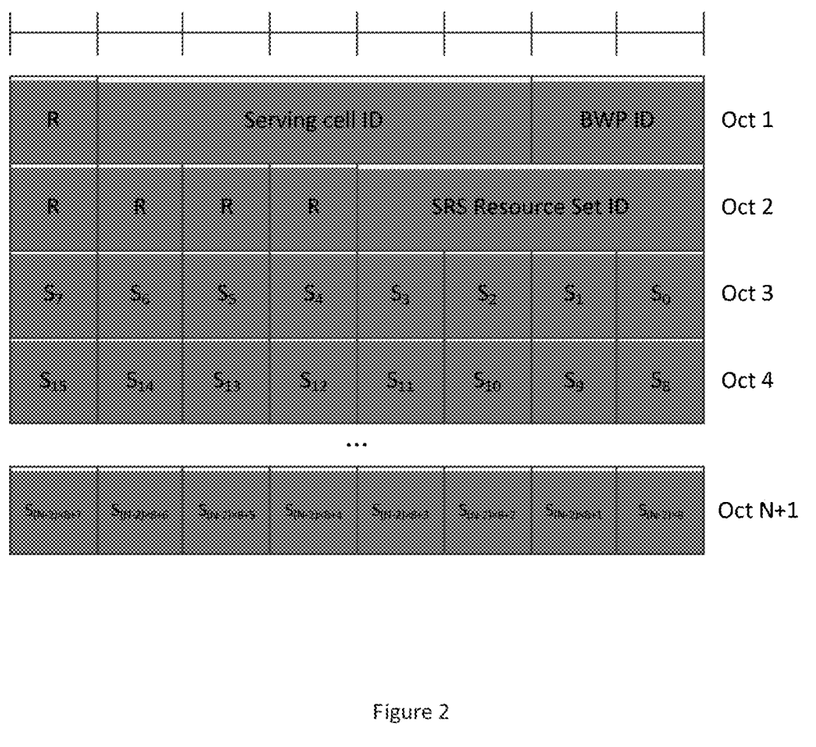
FIG. 2 illustrates an example of SRS pathloss reference signal indication MAC CE according to a second embodiment.

FIG. 2 illustrates an example of the SRS pathloss reference signal indication MAC CE according to the second embodiment. The MAC CE according to the second embodiment is used to indicate a SRS pathloss reference signal (SRS-PathlossReferenceRS) to one SRS resource set. The following fields are included:

(1) Serving Cell ID: This field indicates the identity of the serving cell for which the MAC CE applies. The length of the Serving Cell ID field is 5 bits.

(2) BWP ID: This field indicates a UL BWP for which the MAC CE applies as the codepoint of the DCI bandwidth part indicator field. The length of the BWP ID field is 2 bits.

(3) SRS Resource Set ID: This field indicates a SRS resource set for which the MAC CE applies. The length of the SRS Resource Set ID field is 4 bits, as a maximum of 16 SRS resource sets can be configured for a UE in a BWP according to UE capability.

The above fields (1)-(3) according to the second embodiment are the same as the fields (1)-(3) according to the first embodiment.

(4) $S_i$: Each configured SRS-PathlossReferenceRS is represented by a single bit $S_i$. For a SRS-PathlossReferenceRS with SRS-PathlossReferenceRS-Id configured with an index i for the UL BWP indicated by BWP ID field, the $S_i$ field is set to 1 (or 0) to indicate the SRS-PathlossReferenceRS is activated (or deactivated) as the pathloss reference signal for the SRS resource set indicated by the SRS Resource Set ID field. Obviously, only a single SRS-PathlossReferenceRS (i.e. only one of $S_i$) may be active for a SRS resource set at a time. As there are up to 64 SRS-PathlossReferenceRSs that can be configured for a UE in a BWP according to UE capability, a maximum of 64 $S_i$ may be present in the SRS pathloss reference signal indication MAC CE according to the second embodiment. Incidentally, in the condition that the configured SRS-PathlossReferenceRSs are less than 64, the number of $S_i$ contained in this field may also be less than 64. That is, the number of $S_i$ contained in this field is equal to the number of configured PathlossReferenceRSs, which is up to 64.

(5) R: Reserved bit. Each of the reserved bits may be set to "0".

As shown in FIG. 2, when the number of configured PathlossReferenceRSs for a UE in a BWP is 64, N is equal to 9. That is, in this condition, the SRS pathloss reference signal indication MAC CE according to the second embodiment has a size of 80 (=8*(9+1)) bits. The size of the SRS pathloss reference signal indication MAC CE according to the second embodiment is dependent on the number of the configured PathlossReferenceRSs for a UE in a BWP. The size may range from 24 to 80 and be an integer that is a multiple of 8.

According to the first and the second embodiments, only one PathlossReferenceRS can be indicated (or updated) to one SRS resource set for the UE in a BWP. According to a third embodiment, one SRS pathloss reference signal indication MAC CE may apply to more than one SRS resource set. That is, one MAC CE can indicate (or update) a SRS pathloss reference signal (SRS-PathlossReferenceRS) to each of a plurality of SRS resource sets.

Figure 3:
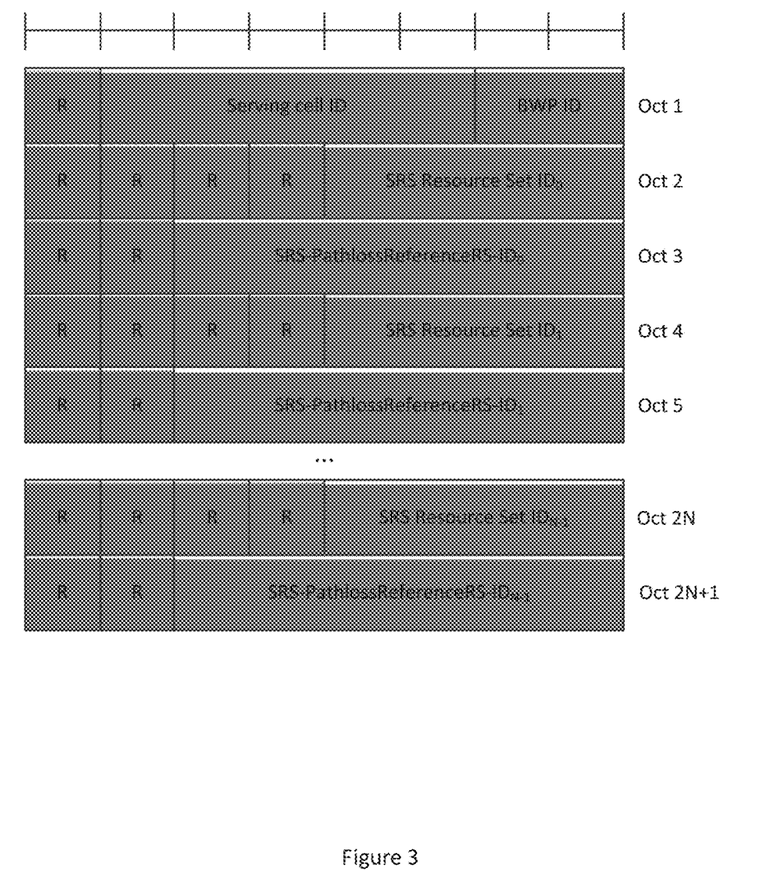
FIG. 3 illustrates an example of SRS pathloss reference signal indication MAC CE according to a third embodiment.

FIG. 3 illustrates an example of the SRS pathloss reference signal indication MAC CE according to the third embodiment. The SRS Resource Set $ID_i$ field indicates the $i^{th}$ SRS resource set ID to which the MAC CE applies. The SRS-PathlossReferenceRS-ID, field indicates a SRS pathloss reference signal (SRS-PathlossReferenceRS) configured to the SRS resource set indicated by the SRS Resource Set $ID_i$ field (the SRS Resource Set $ID_i$ field with the same index i as the SRS-PathlossReferenceRS-$ID_i$ field). The index i may range from 0 to 15 (i.e. N−1), as a maximum of 16 (i.e. N) SRS resource sets may be applied for a UE in a BWP according to UE capability.

In particular, the following fields are included in the SRS pathloss reference signal indication MAC CE according to the third embodiment:

(1) Serving Cell ID: This field indicates the identity of the serving cell for which the MAC CE applies. The length of the Serving Cell ID field is 5 bits.

(2) BWP ID: This field indicates a UL BWP for which the MAC CE applies as the codepoint of the DCI bandwidth part indicator field. The length of the BWP ID field is 2 bits.

The above fields (1)-(2) according to the third embodiment are the same as the fields (1)-(2) according to the first embodiment.

(3) SRS Resource Set $ID_i$: Each SRS Resource Set $ID_i$ indicates a SRS resource set for which the MAC CE applies. The length of each SRS Resource Set $ID_i$ is 4 bits, as a maximum of 16 SRS resource sets may be configured for a UE in a BWP according to UE capability. There might be as many as 16 SRS Resource Set $ID_i$ in the SRS pathloss reference signal indication MAC CE according to the third embodiment. The number of the SRS Resource in Set $ID_i$ contained in the MAC CE according to the third embodiment can be determined by the corresponding subheader of this MAC CE.

(4) SRS-PathlossReferenceRS-$ID_i$: Each SRS-PathlossReferenceRS-$ID_i$ indicates a pathloss reference signal applying to SRS resource set indicated by the SRS Resource Set $ID_i$ field. The length of each SRS-PathlossReferenceRS-$ID_i$ is 6 bits, as up to 64 SRS-PathlossReferenceRSs can be configured for a UE in a BWP according to UE capability. The number of the SRS-PathlossReferenceRS-$ID_i$ contained in the MAC CE according to the third embodiment is the same as the number of the SRS Resource Set $ID_i$.

(5) R: Reserved bit. Each of the reserved bits may be set to "0".

The SRS pathloss reference signal indication MAC CE according to the third embodiment has a variable size. In particular, the MAC CE according to the third embodiment has a size of 8+16*N bits, in which N is the number of SRS resource sets to each of which a SRS pathloss reference signal (SRS-PathlossReferenceRS) is indicated (or updated), and N ranges from 1 to 16. If N=1, the MAC CE according to the third embodiment has the same structure as that according to the first embodiment.

Figure 4:
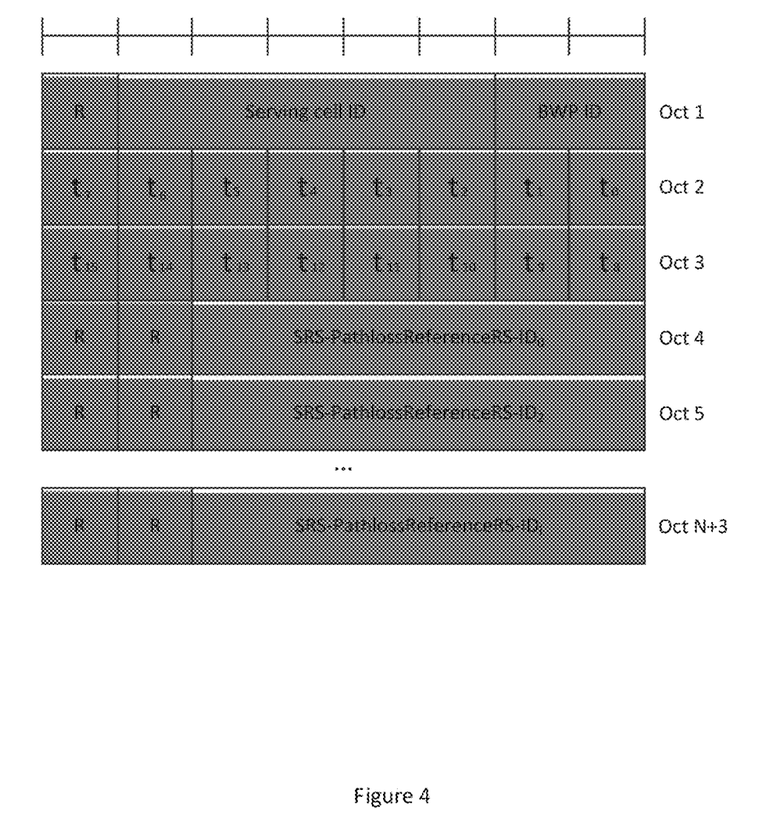
FIG. 4 illustrates an example of SRS pathloss reference signal indication MAC CE according to a fourth embodiment.

FIG. 4 illustrates an example of the SRS pathloss reference signal indication MAC CE according to the fourth embodiment. As shown in FIG. 4, all SRS resource set IDs are represented in the MAC CE using a bitmap, in which each SRS resource set ID is represented by a single bit, i.e. $t_i$ ($t_0$ to $t_{15}$). Each $t_i$ field indicates whether this MAC CE applies to the SRS resource set with the SRS-ResourceSetId equal to i. The $t_i$ field is set to 1 to indicate that the PL-RS of SRS resource set with the SRS-ResourceSetId being equal to i shall be indicated or updated. The SRS-PathlossReferenceRS-$ID_i$ is a SRS-PathlossReferenceRS-ID indicating a SRS pathloss reference signal for the $i^{th}$ SRS resource set, the $t_i$ field of which is set to 1. The $t_i$ field is set to 0 to indicate that the PL-RS of SRS resource set with the SRS-ResourceSetId being equal to i shall not be updated. In other words, when $t_i$=1, a SRS-PathlossReferenceRS-$ID_i$ field is included to indicate the SRS pathloss reference signal to be indicated or updated to the SRS resource set indicated by $t_i$. On the other hand, when $t_i$=0, no SRS-PathlossReferenceRS-$ID_i$ field is included.

As shown in FIG. 4, SRS-PathlossReferenceRS-$ID_0$ field and SRS-PathlossReferenceRS-$ID_2$ field are included in the example of the SRS pathloss reference signal indication MAC CE according to the fourth embodiment. Therefore, both $t_0$ and $t_2$ are equal to 1. On the other hand, SRS-PathlossReferenceRS-$ID_1$ field is not included in the example of the SRS pathloss reference signal indication MAC CE according to the fourth embodiment. Therefore, $t_1$ is equal to 0. That is, when SRS-PathlossReferenceRS-ID$_i$ field is not included, $t_i$ is equal to 0.

The SRS-PathlossReferenceRS-ID fields, if included, are included in a sequential manner (from the lowest number 0 to the highest number 15). For example, as shown in FIG. 4, SRS-PathlossReferenceRS-ID$_0$ field is included just in front of SRS-PathlossReferenceRS-ID$_2$ field, as no PathlossReferenceRS-ID$_1$ field is included.

In particular, the following fields are included in the SRS pathloss reference signal indication MAC CE according to the fourth embodiment:

(1) Serving Cell ID: This field indicates the identity of the serving cell for which the MAC CE applies. The length of the Serving Cell ID field is 5 bits.

(2) BWP ID: This field indicates a UL BWP for which the MAC CE applies as the codepoint of the DCI bandwidth part indicator field. The length of the BWP ID field is 2 bits.

The above fields (1)-(2) according to the fourth embodiment are the same as the fields (1)-(2) according to the first embodiment.

(3) $t_i$ field (i.e. $t_0$ to $t_{15}$): each $t_i$, which is 1 bit, indicates whether the PL-RS for a SRS resource set is indicated or updated by that MAC CE. $t_i$ field is set to 1 when the PL-RS for this SRS resource set is to be indicated or updated with a SRS pathloss reference signal indicated by a SRS-PathlossReferenceRS-ID$_i$ field. $t_i$ field is set to 0 when the PL-RS for this SRS resource set is not updated by this MAC CE (i.e. maintained with the existing SRS pathloss reference signal). No SRS-PathlossReferenceRS-ID$_i$ field is included when $t_i$ field is set to 0.

(4) SRS-PathlossReferenceRS-ID$_i$ (i.e. at least one of SRS-PathlossReferenceRS-ID$_0$ to SRS-PathlossReferenceRS-ID$_{15}$): when $t_i$ field is set to 1, a SRS-PathlossReferenceRS-ID$_i$ field is included to indicate a SRS pathloss reference signal to be indicated or updated to the SRS resource set indicated by $t_i$. Each of the SRS-PathlossReferenceRS-ID$_i$ fields is 6 bits.

(5) R: Reserved bit. Each of the reserved bits may be set to "0".

According to the fourth embodiment, the SRS pathloss reference signal indication MAC CE has a size of 24+8*N bits, in which N is the number of SRS resource sets to which the SRS-PathlossReferenceRS-ID is to be indicated (or updated), i.e. the number of $t_i$ fields being set to 1, and N ranges from 1 to 16.

In the above-described first to fourth embodiments, up to 64 SRS-PathlossReferenceRSs can be indicated or updated to the SRS resource set. According to a fifth embodiment, the existing PUCCH-PathlossReferenceRSs may be reused as SRS-PathlossReferenceRSs.

It has agreed that the total number of maximum configurable pathloss signals for PUCCH, PUSCH and SRS is 64 and it has also agreed that up to 64 PL-RS for PUCCH can be configured for a UE per BWP. So, it is reasonable to use PUCCH-PathlossReferenceRSs as the PL-RS indication (or update) for SRS.

The SRS pathloss reference signal indication MAC CE according to the fifth embodiment has the same structure as any of the SRS pathloss reference signal indication MAC CEs according to the first to the fourth embodiments, except that the SRS-PathlossReferenceRS-ID field (SRS-PathlossReferenceRS-ID field in the first embodiment, S$_i$ field in the second embodiment, SRS-PathlossReferenceRS-ID$_i$ field in the third embodiment, SRS-PathlossReferenceRS-ID$_i$ field in the fourth embodiment) is replaced with PUCCH-PathlossReferenceRS-Id field. Especially, each S$_i$ field in the second embodiment represents a configured SRS-PathlossReferenceRS while each S$_i$ field in the fifth embodiment represents a configured PUCCH-PathlossReferenceRS.

In the above-described first to fourth embodiments, a SRS pathloss reference signal (SRS-PathlossReferenceRS) is indicated or updated to the SRS resource set. The SRS-PathlossReferenceRS can only be configured as a SSB or NZP-CSI-RS. According to the sixth embodiment, the SSB or NZP-CSI-RS is indicated or updated to the SRS resource set.

According to the sixth embodiment, the SRS-PathlossReferenceRS-ID field is replaced with PL-RS ID which is either ssb-Index or NZP-CSI-RS-Resource-Index. 64 SSBs can be monitored by the UE and up to 128 NZP-CSI-RS resources can be configured for a UE in a BWP according to UE capability. Therefore, the PL-RS ID can be "0+ssb-Index" or "NZP-CSI-RS-Resource-Index", where the UE can identify the RS type (ssb-Index or NZP-CSI-RS-Resource-Index) by a F$_i$ field.

The SRS pathloss reference signal indication MAC CE according to the sixth embodiment has substantially the same structure as any of the SRS pathloss reference signal indication MAC CEs according to the first to the fourth embodiments, except that the SRS-PathlossReferenceRS-ID field (SRS-PathlossReferenceRS-ID field in the first embodiment, S$_i$ field in the second embodiment, SRS-PathlossReferenceRS-ID$_i$ field in the third embodiment, SRS-PathlossReferenceRS-ID$_i$ field in the fourth embodiment) is replaced with PL-RS ID field.

Especially, each S$_i$ field in the second embodiment represents a configured SRS-PathlossReferenceRS while each S$_i$ field in the sixth embodiment represents a configured PL-RS. In addition, as each SRS-PathlossReferenceRS-ID field occupies 6 bits while each PL-RS ID$_i$ field occupies 7 bits and each F$_i$ field occupies 1 bit, the two reserved bits in the same "Oct" as the SRS-PathlossReferenceRS-ID field and the 6 bits for the SRS-PathlossReferenceRS-ID field are used in combination for the F$_i$ field and the PL-RS ID$_i$ field in the sixth embodiment.

Figure 5:
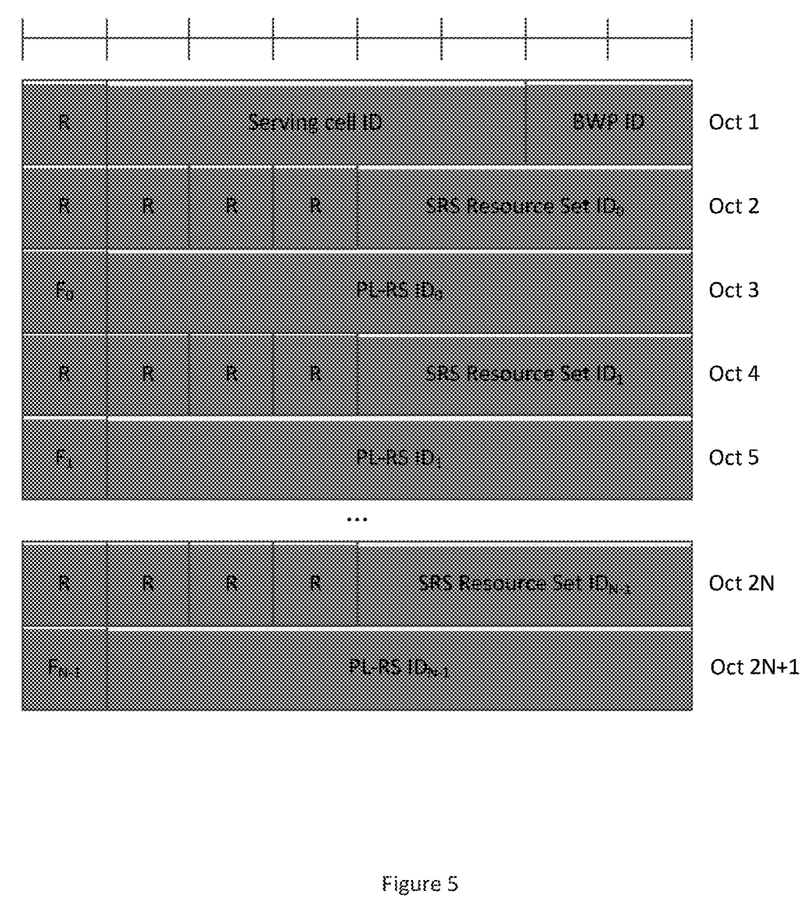
FIG. 5 illustrates an example of SRS pathloss reference signal indication MAC CE according to a sixth embodiment

An example of SRS pathloss reference signal indication MAC CE according to the sixth embodiment, in which PL-RS is indicated or updated to more than one SRS resource set (similar to the third embodiment), is illustrated in FIG. 5. In particular, the following fields are included:

(1) Serving Cell ID: This field indicates the identity of the serving cell for which the MAC CE applies. The length of the Serving Cell ID field is 5 bits.

(2) BWP ID: This field indicates a UL BWP for which the MAC CE applies as the codepoint of the DCI bandwidth part indicator field. The length of the BWP ID field is 2 bits.

The above fields (1)-(2) according to the sixth embodiment are the same as the fields (1)-(2) according to the first embodiment.

(3) SRS Resource Set ID$_i$: Each SRS Resource Set ID$_i$ indicates a SRS resource set for which the MAC CE applies. The length of each SRS Resource Set ID$_i$ field is 4 bits, as a maximum of 16 SRS resource sets may be configured for a UE in a BWP according to UE capability.

The above fields (3) according to the sixth embodiment are the same as the fields (3) according to the third embodiment.

(4) F$_i$: Each F$_i$ indicates the type of a resource used as a PL-RS for SRS resource set with the SRS-ResourceSetId indicated by the SRS Resource Set ID$_i$ field. F$_i$ is set to 1 to indicate that NZP CSI-RS resource index is used, and it is set to 0 to indicate that SSB index is used. The length of each F$_i$ is 1 bit.

(5) PL-RS $ID_i$: Each PL-RS $ID_i$ contains an identifier of the resource (pathloss reference signal) used for the SRS resource set with the SRS-ResourceSetId indicated by the SRS Resource Set $ID_i$ field. If $F_i$ is set to 0, this field contains SSB-Index. If $F_i$ is set to 1, this field contains NZP-CSI-RS-Resource-Index. The length of each PL-RS $ID_i$ is 7 bits. The SSB-Index itself occupies 6 bits while the NZP-CSI-RS-Resource-Index occupies 7 bits. So, if a SSB-Index is indicated, the first bit of this field is set to 0.

(6) R: Reserved bit. Each of the reserved bits may be set to "0".

A comparison between FIG. 3 and FIG. 5 can indicate that two reserved bits in the same "Oct" as the "SRS-Pathloss-ReferenceRS-$ID_i$" field of Figure are occupied in the sixth embodiment, as the "$F_i$" field and the "PL-RS $ID_i$" field occupy eight bits in total.

The SRS pathloss reference signal indication MAC CE illustrated in FIG. 5 has a size of 8+16*N bits, in which N is the number of SRS resource sets to each of which the PL-RS (either SSB or NZP-CSI-RS) is to be indicated (or updated), and N ranges from 1 to 16.

In the first to the sixth embodiments, each SRS resource set is individually indicated or updated with a SRS pathloss reference signal. This may be inefficient if a plurality of SRS resource sets configured for different BWPs in different cells are to be indicated or updated with the same SRS pathloss reference signal.

According to a seventh embodiment, all of SRS resource sets configured in all BWPs on multiple cells with the same SRS resource set ID may be indicated or updated with the same SRS pathloss reference signal.

It has been agreed that simultaneous spatial relation update for SP and/or AP SRS resource across multiple CCs/BWPs by a MAC CE is supported. Up to 2 lists of CCs, e.g. simultaneousSpatialRelationCellList0 and simultaneousSpatialRelationCellList1, can be configured by RRC per UE. It means that aperiodic and/or semi-persistent SRS resources in all BWPs on all cells contained in a simultaneousSpatialRelationCellList with the same SRS resource ID can share the same spatial relation for transmission.

When one or more simultaneousSpatialRelationCellList(s) (i.e. simultaneousSpatialRelationCellList0 and/or simultaneousSpatialRelationCellList 1) are configured for a UE, and the UE receive a SRS pathloss reference signal indication MAC CE for a BWP, if the serving cell ID indicated by the serving cell ID field in the MAC CE is included in one simultaneousSpatialRelationCellList, the indicated pathloss reference signal is configured for (indicated to or updated to) all the SRS resource sets with the same SRS resource set ID for all BWPs in all the cells within this simultaneousSpatialRelationCellList containing the serving cell ID.

The SRS pathloss reference signal indication MAC CE according to the seventh embodiment has the same structure as any of the SRS pathloss reference signal indication MAC CEs according to the first to the sixth embodiments. In the first to the sixth embodiments, one PL-RS (SRS pathloss reference signal indicated by SRS-PathlossReferenceRS-ID in the first embodiment, SRS pathloss reference signal indicated by $S_i$ in the second embodiment, each of SRS pathloss reference signals indicated by SRS-PathlossReferenceRS-$ID_i$ in the third embodiment and the fourth embodiment, PUCCH pathloss reference signal used as SRS pathloss reference signal in the fifth embodiment, and each of SSBs or NZP-CSI-RS resources indicated by PL-RS $ID_i$ in the sixth embodiment) is indicated or updated to only one SRS resource set. However, in the seventh embodiment, according to the Serving cell ID field included in the MAC CE, one PL-RS may be indicated or updated to a multiple of SRS resource sets, i.e. all the SRS resource sets with the same SRS resource set ID for all BWPs in all the cells within a simultaneousSpatialRelationCellList containing the serving cell ID indicated in the Serving cell ID field.

For example, suppose cell 1, cell 2 and cell 3 are within simultaneousSpatialRelationCellList0, and the Serving cell ID of the SRS pathloss reference signal indication MAC CE according to the seventh embodiment is cell 1. In this condition, the SRS pathloss reference signal indicated by PL-RS $ID_i$ (e.g. SRS-PathlossReferenceRS-$ID_i$, or PL-RS $ID_i$) included in the MAC CE according to the seventh embodiment is indicated or updated to the SRS resource sets with the same SRS Resource Set $ID_i$ for all BWPs (e.g. BWP1, BWP2, BWP3 and BWP4) of all cells within simultaneousSpatialRelationCellList0 (e.g. cell 1, cell2 and cell3).

Figure 6:
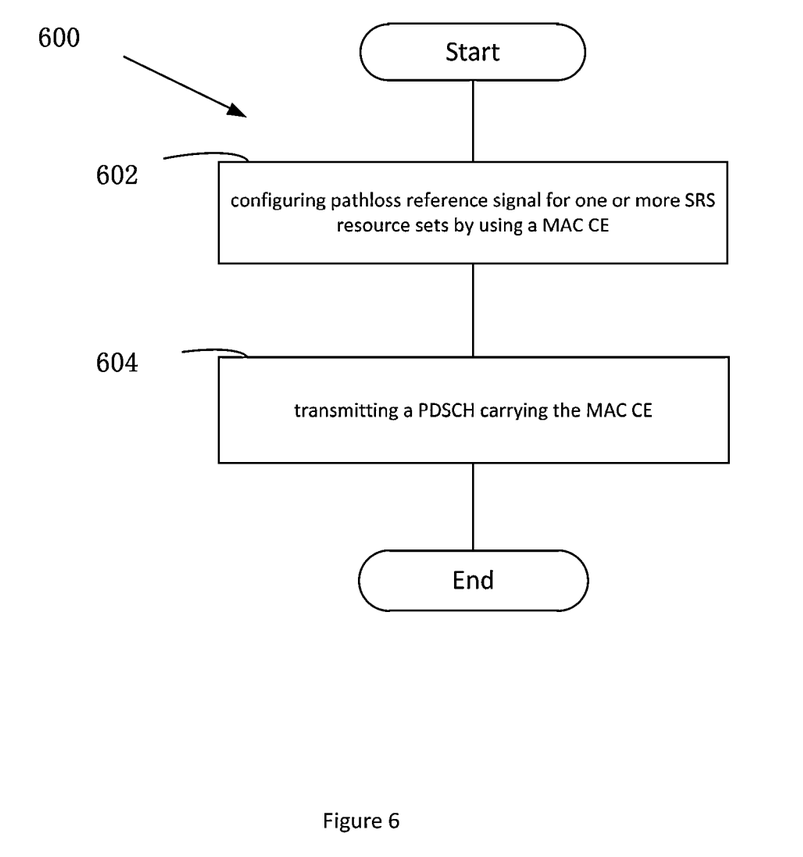
FIG. 6 is a schematic flow chart diagram illustrating an embodiment of a method for configuring pathloss reference signal for SRS.

FIG. 6 is a schematic flow chart diagram illustrating an embodiment of a method 600 for configuring SRS pathloss reference signal for SRS resource set(s). In some embodiments, the method 600 is performed by an apparatus, such as a base unit. In certain embodiments, the method 600 may be performed by a processor executing program code, for example, a microcontroller, a microprocessor, a CPU, a GPU, an auxiliary processing unit, a FPGA, or the like.

The method 600 may include 602 configuring pathloss reference signal for one or more SRS resource sets by using a MAC CE and 604 transmitting a PDSCH carrying the MAC CE. The MAC CE can be a SRS pathloss reference signal indication MAC CE according to any of the first embodiment to the seventh embodiment.

Figure 7:
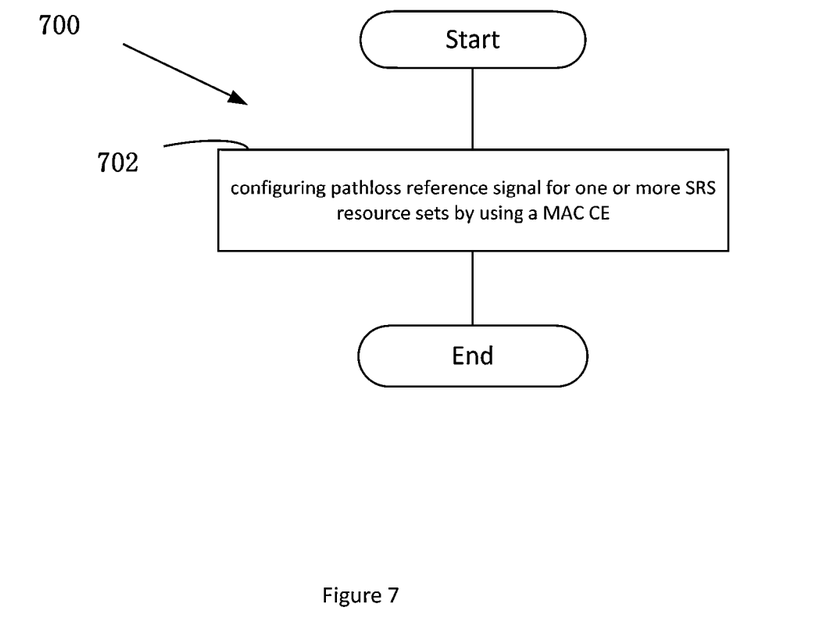
FIG. 7 is a schematic flow chart diagram illustrating a further embodiment of a method for configuring pathloss reference signal for SRS.

FIG. 7 is a schematic flow chart diagram illustrating an embodiment of a method 700 for configuring SRS pathloss reference signal for SRS resource set(s). In some embodiments, the method 700 is performed by an apparatus, such as a remote unit (UE). In certain embodiments, the method 700 may be performed by a processor executing program code, for example, a microcontroller, a microprocessor, a CPU, a GPU, an auxiliary processing unit, a FPGA, or the like.

The method 700 may include 702 receiving a PDSCH carrying a MAC CE, wherein the MAC CE is used to configure pathloss reference signal for one or more SRS resource sets. The MAC CE can be a SRS pathloss reference signal indication MAC CE according to any of the first embodiment to the seventh embodiment.

Figure 8:
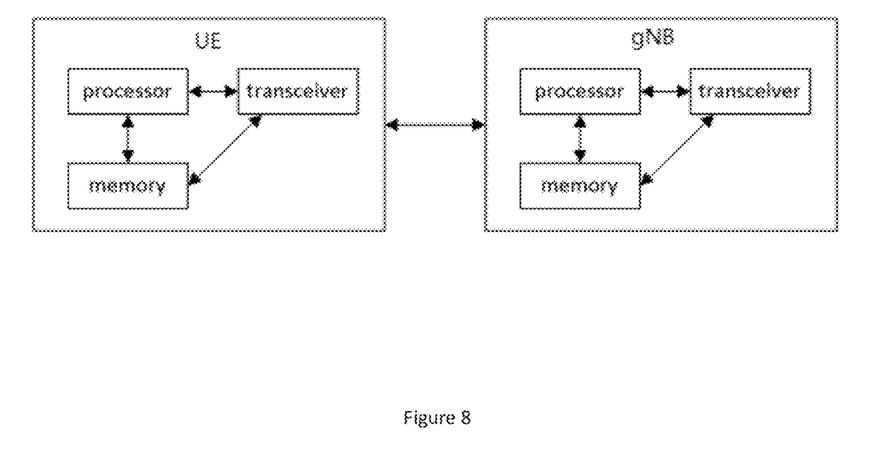
FIG. 8 is a schematic block diagram illustrating apparatuses according to one embodiment.

FIG. 8 is a schematic block diagram illustrating apparatuses according to one embodiment.

Referring to FIG. 8, the UE (i.e. the remote unit) includes a processor, a memory, and a transceiver. The processor implements a function, a process, and/or a method which are proposed in FIG. 7. The gNB (i.e. base unit) includes a processor, a memory, and a transceiver. The processors implement a function, a process, and/or a method which are proposed in FIG. 6. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by a base unit, the method comprising:
    configuring a pathloss reference signal for one or more sounding reference signal (SRS) resource sets using a media access control (MAC) control element (CE); and
    transmitting the MAC-CE via a physical downlink shared channel (PDSCH), wherein the MAC CE indicates a pathloss reference signal (PL-RS) identifier (ID) and one or more SRS resource set IDs corresponding to the one or more SRS resource sets, an SRS resource set ID indicating an SRS resource set for which the MAC CE applies.

2. The method of claim 1, wherein, the MAC CE further includes one or more SRS pathloss reference signal identifiers (IDs) each of which indicates a pathloss reference signal configured for the SRS resource set indicated by the SRS resource set ID in the MAC CE.

3. The method of claim 1, wherein the MAC CE includes a single SRS resource set identifier (ID) and a bitmap of Si,
    each Si, which is 1 bit, indicates an activation status of a configured SRS pathloss reference signal, and
    only a single Si is activated for an SRS resource set indicated by a single SRS resource set ID.

4. The method of claim 1, wherein the MAC CE includes a bitmap of ti,
    each ti, which is 1 bit, indicates a SRS resource set identifier (ID), and
    each ti indicates whether the MAC CE applies to the SRS resource set with the SRS resource set ID being equal to i.

5. The method of claim 1, wherein the MAC CE includes the pathloss reference signal (PL-RS) identifier (ID) which is either a synchronization signal block (SSB)-index indicating a synchronization signal physical broadcast channel (SS/PBCH) block or a channel state information reference signal (CSI-RS)-index indicating a non-zero power (NZP) CSI-RS resource, wherein the SS/PBCH block or the NZP CSI-RS resource is used as the pathloss reference signal configured for an SRS resource set indicated by a SRS resource set identifier (ID).

6. The method of claim 5, wherein, the MAC CE further includes a one bit field to indicate whether the PL-RS ID is the SSB-index or the CSI-RS-index.

7. The method of claim 1, wherein, the MAC CE includes a serving cell identifier (ID),
    when the serving cell ID is within a simultaneousSpatialRelationCellList, the pathloss reference signal is configured for all SRS resource sets with a same SRS resource set identifier (ID) for all bandwidth parts (BWPs) in cells within the simultaneousSpatialRelationCellList containing the serving cell ID.

8. A base unit for wireless communication comprising:
    at least one memory; and
    at least one processor coupled with the at least one memory and configured to cause the base unit to:
        configure a pathloss reference signal for one or more sounding reference signal (SRS) resource sets using a media access control (MAC) control element (CE); and
        transmit the MAC-CE via a physical downlink shared channel (PDSCH), wherein the MAC CE indicates a pathloss reference signal (PL-RS) identifier (ID) and one or more SRS resource set IDs corresponding to the one or more SRS resource sets, an SRS resource set ID indicating an SRS resource set for which the MAC CE applies.

9. The base unit of claim 8, wherein, the MAC CE further includes one or more SRS pathloss reference signal identifiers (IDs) each of which indicates a pathloss reference signal configured for the SRS resource set indicated by the SRS resource set ID in the MAC CE.

10. The base unit of claim 8, wherein, the MAC CE includes a single SRS resource set identifier (ID) and a bitmap of Si,
    each Si, which is 1 bit, indicates an activation status of a configured SRS pathloss reference signal, and
    only a single Si is activated for an SRS resource set indicated by a single SRS resource set ID.

11. The base unit of claim 8, wherein, the MAC CE includes a bitmap of ti,
    each ti, which is 1 bit, indicates a SRS resource set identifier (ID), and
    each ti indicates whether the MAC CE applies to the SRS resource set with the SRS resource set ID being equal to i.

12. The base unit of claim 8, wherein, the MAC CE includes a pathloss reference signal (PL-RS) identifier (ID) which is either a synchronization signal block (SSB)-index indicating a synchronization signal physical broadcast channel (SS/PBCH) block or a channel state information reference signal (CSI-RS)-index indicating a non-zero power (NZP) CSI-RS resource, wherein the SS/PBCH block or the NZP CSI-RS resource is used as the pathloss reference signal configured for an SRS resource set indicated by a SRS resource set identifier (ID).

13. The base unit of claim 12, wherein, the MAC CE further includes a one bit field to indicate whether the PL-RS ID is the SSB-index or the CSI-RS-index.

14. The base unit of claim 8, wherein, the MAC CE includes a serving cell identifier (ID),
    when the serving cell ID is within a simultaneousSpatialRelationCellList, the pathloss reference signal is configured for all SRS resource sets with a same SRS resource set identifier (ID) for all bandwidth parts (BWPs) in cells within the simultaneousSpatialRelationCellList containing the serving cell ID.

15. A user equipment (UE) for wireless communication, comprising:
   at least one memory; and
   at least one processor coupled with the at least one memory and configured to cause the UE to:
      receive a media access control (MAC) control element (CE) via a physical downlink shared channel (PDSCH), wherein the MAC CE is used to configure pathloss reference signal for one or more sounding reference signal (SRS) resource sets, and wherein the MAC CE indicates one or more pathloss reference signal (PL-RS) identifiers (IDs) and one or more SRS resource set IDs corresponding to the one or more SRS resource sets, an SRS resource set ID indicating an SRS resource set for which the MAC CE applies.

16. The UE of claim 15, wherein, the MAC CE further includes one or more SRS pathloss reference signal identifiers (IDs) each of which indicates a pathloss reference signal configured for the SRS resource set indicated by the SRS resource set ID in the MAC CE.

17. The UE of claim 15, wherein, the MAC CE includes a single SRS resource set identifier (ID) and a bitmap of Si,
   each Si, which is 1 bit, indicates an activation status of a configured SRS pathloss reference signal, and
   only a single Si is activated for an SRS resource set indicated by a single SRS resource set ID.

18. A processor for wireless communication, comprising:
   at least one controller coupled with at least one memory and configured to cause the processor to:
      receive a media access control (MAC) control element (CE) via a physical downlink shared channel (PDSCH) carrying, wherein the MAC CE is used to configure pathloss reference signal for one or more sounding reference signal (SRS) resource sets, and wherein the MAC CE indicates one or more pathloss reference signal (PL-RS) identifiers (IDs) and one or more SRS resource set IDs corresponding to the one or more SRS resource sets, an SRS resource set ID indicating an SRS resource set for which the MAC CE applies.

19. The processor of claim 18, wherein, the MAC CE further includes one or more SRS pathloss reference signal identifiers (IDs) each of which indicates a pathloss reference signal configured for the SRS resource set indicated by the SRS resource set ID in the MAC CE.

20. The processor of claim 18, wherein, the MAC CE includes a single SRS resource set identifier (ID) and a bitmap of Si,
   each Si, which is 1 bit, indicates an activation status of a configured SRS pathloss reference signal, and
   only a single Si is activated for an SRS resource set indicated by a single SRS resource set ID.

* * * * *